United States Patent Office 3,217,054
Patented Nov. 9, 1965

3,217,054
PURIFICATION PROCESS
Vladimir Haensel, Hinsdale, and Carl B. Linn., Riverside, Ill., assignors to Universal Oil Products Company, Des Plaines, Ill., a corporation of Delaware
No Drawing. Filed Oct. 16, 1961, Ser. No. 145,457
16 Claims. (Cl. 260—674)

This invention relates to a process for the removal of the reaction products of water, boron halide, and a boron halide-modified substantially anhydrous inorganic oxide from a substantially anhydrous fluid mixture containing the same, and more particularly relates to a process for the removal of the reaction products of water, boron halide, and a boron halide-modified substantially anhydrous inorganic oxide from a substantially anhydrous fluid mixture containing the same by contacting said reaction products and fluid mixture with a reactant consisting of a metal having an atomic number from 23 to 28 inclusive. Still more particularly, this invention relates to a process for the removal of the reaction products of water, boron halide, and a boron halide-modified substantially anhydrous inorganic oxide from a substantially anhydrous fluid mixture containing the same, contacting said reaction products and fluid with a reactant consisting of a metal having an atomic number from 23 to 28 inclusive, reacting at least a portion of said reaction products with said metal and recovering purified fluid.

The term "reaction" means a mechanism by which at least one component of a mixture selectively combines in some form with the solid or solids with which the mixture is contacted; such mechanisms may be adsorption, absorption, clathration, occlusion or chemical reaction, and all these mechanisms are generically designated herein as "reaction."

We have found that in the production of alkylated aromatic hydrocarbons utilizing a boron fluoride-modified substantially anhydrous inorganic oxide, alkylatable aromatic hydrocarbon, olefin-acting compound, and boron fluoride, reaction products of water, boron fluoride, and boron fluoride-modified substantially anhydrous inorganic oxide tend to form and accumulate in the process streams. The principal object of the present invention is to provide a process for the efficient and economical removal of these reaction products from the hereinbefore mentioned process streams. The process streams may include the presence of substantially anhydrous gaseous mixtures or substantially anhydrous liquid hydrocarbon, such as an aromatic hydrocarbon comprising benzene, or higher homologs of benzene.

Another object of this invention is to provide a process whereby the reaction products of water, boron halide, and boron halide-modified substantially anhydrous inorganic oxide can be removed continuously from the hereinabove mentioned process streams without appreciable consumption or loss of the recovered purified stream. Other objects of this invention will be set forth hereinafter as part of the specifications and in the accompanying examples.

In one embodiment, the present invention relates to a process for removing the reaction products of water, boron halide, and a boron halide-modified substantially anhydrous inorganic oxide from a substantially anhydrous fluid mixture containing the same, which comprises contacting said reaction products and fluid with a reactant consisting of a metal having an atomic number from 23 to 28 inclusive, reacting at least a portion of said reaction products with said metal, and recovering purified fluid.

Another embodiment of the present invention relates to a process for removing the reaction products of water, boron halide, and a boron halide-modified substantially anhydrous inorganic oxide from a substantially anhydrous gaseous mixture containing the same, which comprises contacting said reaction products and gas with a reactant consisting of a metal having an atomic number from 23 to 28 inclusive, reacting at least a portion of said reaction products with said metal, and recovering purified gas.

A further embodiment of the present invention relates to a process for removing the reaction products of water, boron halide, and a boron halide-modified substantially anhydrous inorganic oxide from a substantially anhydrous liquid hydrocarbon containing the same, which comprises contacting said reaction products and liquid hydrocarbon with a reactant consisting of a metal having an atomic number from 23 to 28 inclusive, reacting at least a portion of said reaction products with said meal, and recovering purified liquid hydrocarbon.

A specific embodiment of the present invention relates to a process for removing the reaction products of water, boron fluoride, and a boron fluoride-modified substantially anhydrous inorganic oxide from a substantially anhydrous gaseous mixture containing the same which comprises contacting said reaction products and gas with a reactant consisting of a metal having an atomic number from 23 to 28 inclusive in a reaction zone at reaction conditions including a temperature of from about 0° to about 300° C. and a pressure of from about atmospheric to about 200 atmospheres, reacting at least a portion of said reaction products with said metal, and recovering purified gas.

A further specific embodiment of the present invention relates to a process for removing the reaction products of water, boron fluoride, and a boron fluoride-modified substantially anhydrous inorganic oxide from a substantially anhydrous gaseous mixture containing the same, which comprises contacting said reaction products and gas with a reactant consisting of iron in a reaction zone at reaction conditions including a temperature of from about 0° to about 300° C. and a pressure of from about atmospheric to about 200 atmospheres, reacting at least a portion of said reaction products with said iron, and recovering purified gas.

Another embodiment of the present invention relates to a process for removing the reaction products of water, boron fluoride, and a boron fluoride-modified substantially anhydrous inorganic oxide from a substantially anhydrous liquid hydrocarbon containing the same, which comprises contacting said reaction products and liquid hydrocarbon with a reactant consisting of a metal having an atomic number from 23 to 28 inclusive, in a reaction zone at reaction conditions including a temperature of from about 0° to about 300° C. and a pressure of from about atmospheric to about 200 atmospheres, reacting at least a portion of said reaction products with said metal, and recovering purified liquid hydrocarbon.

A still further specific embodiment of the present invention relates to a process for removing the reaction products of water, boron fluoride, and a boron fluoride-modified substantially anhydrous inorganic oxide from substantially anhydrous liquid benzene containing the same which comprises contacting said reaction products and benzene with a reactant consisting of iron in a reaction zone at reaction conditions including a temperature of from about 0° to about 300° C. and a pressure of from about atmospheric to about 200 atmospheres, reacting at least a portion of said reaction products with said iron, and recovering purified liquid benzene.

Other embodiments of the present invention will become apparent in considering the specification as hereinafter set forth.

As set forth hereinabove, the present invention relates to a process for the removal of the reaction products of water, boron halide, and a boron halide-modified substantially anhydrous inorganic oxide from a fluid mixture utilizing a metal having an atomic number from 23 to 28 inclusive, as the reacting agent. These reaction products of water, boron halide, and boron halide-modified substantially anhydrous inorganic oxide have been encountered as the hydrates of boron trifluoride including boron trifluoride monohydrate, boron trifluoride dihydrate, boron trifluoride trihydrate, etc. In addition to the hereinabove mentioned compounds, other compounds comprising boron, hydrogen, oxygen and fluorine, may be present as aforesaid, such as, for example, $B(OH)_2F$, $B(OH)F_2$, etc. Intermediate solid but volatile materials, containing boron, oxygen and fluorine in approximately equal atomic amounts are also sometimes encountered. These compounds are also sometimes encountered in combination with each other, with water, or with boron trifluoride, as well as by themselves. It will be appreciated by those skilled in the art that the foregoing list of compounds has by no means exhausted the total number of compounds that may form reversibly when water and boron halide are present in a fluid process stream. Such enumerations are intended to be exemplary only and not limiting to the broad scope of the present invention.

Typical metals utilizable as reaction agents in the process of this invention include those characterized as having an atomic number from 23 to 28 inclusive including vanadium, chromium, manganese, iron, cobalt and nickel. Of the above-mentioned metals, iron is preferred for removing the reaction products of water, boron fluoride, and a boron fluoride-modified substantially anhydrous inorganic oxide from a substantially anhydrous fluid mixture.

Many fluid mixtures can be substantially purified utilizing the process of the present invention. Suitable gaseous mixtures include such components as hydrogen, methane, ethane, propane, inert gases, boron halides, etc. Suitable liquid hydrocarbon mixtures include those such as the paraffins, cycloparaffins, aromatics, etc. Suitable paraffins are normal butane, isobutane, normal pentane, isopentane, normal hexane, etc. Suitable cycloparaffins are cyclopentane, methylcyclopentane, cyclohexane, methylcyclohexane, and other alkylcycloparaffins or mixtures thereof. Suitable aromatic hydrocarbons include benzene, toluene, and other alkylbenzenes or mixtures thereof. Preferred hydrocarbons are monocyclic aromatic hydrocarbons, that is, benzene hydrocarbons. Higher molecular weight alkylaromatic hydrocarbons are also suitable. These include those aromatic hydrocarbons such as are produced by the alkylation of aromatic hydrocarbons with olefin polymers and are used as intermediates in the preparation of sulfonate surface-active agents. Such products are frequently referred to in the art as alkylate, and include hexylbenzenes, nonylbenzenes, dodecylbenzenes, pentadecylbenzenes, hexyltoluenes, nonyltoluenes, dodecyltoluenes, pentadecyltoluenes, etc. or mixtures thereof. Very often alkylate is obtained as a high boiling fraction in which the alkyl group attached to the aromatic nucleus varies in size from about $C_9$ to $C_{18}$. Other suitable aromatic hydrocarbons, which at specified reaction conditions, depending upon the melting point of the aromatic chosen, would be in liquid form, would include those aromatic hydrocarbons with two or more aryl groups such as diphenyl, diphenylmethane, naphthalene, and other polycyclic aromatics. Examples of other aromatic hydrocarbons within the scope of this invention which at specified reaction conditions depending upon the melting point of the aromatic chosen, would be in liquid form, include those containing condensed aromatic rings. These include naphthalene, alkylnaphthalenes, anthracene, phenanthrene, naphthacene, rubrene, etc. Of the above-mentioned aromatic hydrocarbons that could be utilized in the process of this invention, the benzene hydrocarbons are preferred, and of the preferred benzene hydrocarbons, benzene itself is particularly preferred.

In accordance with the process of the present invention, the removal of the reaction products of water, boron halide, and boron halide-modified substantially anhydrous inorganic oxide from a substantially anhydrous fluid mixture containing the same is effected by contacting said reaction products with a reactant consisting of a metal having an atomic number from 23 to 28 inclusive at a temperature of from about 0° C. or lower to about 300° C. or higher and preferably from about 50° to about 250° C., although the exact temperature needed will depend upon the particular fluid to be purified, the particular metal utilized, and the pressure of the reaction zone. The lower temperature limit is one in which the metal reacting agent forms a stable metal halide-boron halide complex. This reaction should be effected under sufficient pressure to preclude a loss of boron halide. The upper temperature limit lies below the decomposition temperature of said metal halide-boron halide complex. The reaction process is usually carried out at a pressure of from about atmospheric to about 200 atmospheres. The pressure utilized is usually selected to effect the desired reaction and to prevent decomposition of the particular metal halide-boron halide complex formed at elevated temperatures. The reaction bed is then periodically regenerated for use by heating the metal halide-boron halide complex to a temperature where decomposition occurs. For example, when utilizing iron with boron fluoride as the boron halide in a system, the complex of boron fluoride and ferrous fluoride forms in the presence of hydrogen fluoride from the reaction products of water and boron fluoride. This complex is stable at ordinary temperature and pressure; however, when the complex is heated, gradually at first and substantially at 50° C. and atmospheric pressure, boron fluoride is evolved. Therefore, the complex should not be heated to high temperatures at atmospheric pressure unless decomposition of the complex is desired for the purpose of regeneration of the metal reactant utilized. The decomposition of the boron halide-saturated metal may be conducted in the presence of the fluid mixture if desired.

In removing the hereinbefore mentioned reaction products from a fluid containing the same with the type of reaction media herein described, either batch or continuous operations may be employed. The actual operation of the process may be either upflow or downflow. The metal reaction agents may be utilized in the form of granules, grains, powders, particles, spheres, balls, tubular shapes, etc. The details of processes of this general character are familiar to those skilled in the art and any necessary additions or modifications of the above general procedures will be more or less obvious and can be made without departing from the broad scope of this invention.

The process of this invention is illustrated by the following examples which are introduced for the purpose of illustration and with no intention of unduly limiting the generally broad scope of the invention.

*Example 1*

This example illustrates the effect of the formation of the reaction products of water, boron halide and a boron halide-modified substantially anhydrous inorganic oxide during the production of alkylated aromatics. The processing unit consisted of liquid and gas charge pumps, reactors, high-pressure gas separators, pressure controllers, boron fluoride treating system, feed pretreating system, fractionating columns, and liquid and gas collection systems. The catalyst charged to the reactors comprised a baron fluoride-modified substantially anhydrous inorganic oxide, namely boron trifluoride-modified alumina. The unit was started up according to standard procedures so that ethylbenzene was produced. Substantially pure boron trifluoride was charged to the unit in sufficient quantity along with substantially anhydrous benzene and ethylene so that the benzene was converted to ethylbenzene. Additional boron trifluoride was added as needed to maintain good conversion. Operating temperatures were held at a minimum consistent with good conversion. The operating pressure was selected so that the benzene was kept substantially in the liquid phase. The aromatic to olefin ratio was kept at a maximum at all times consistent with the equipment limitations, in order to insure low polyethylbenzene production. The fractionation section first separated part of the benzene recycle by flash and then the remainder by fractionation. The maximum recycle possible was flashed because of the lower heat requirement for flashing until the ethylbenzene and heavier products present became a contamination factor. Most of the boron fluoride was in the effluent vapors. Part of this boron fluoride was condensed with the benzene recycle and returned to the reactor. The remaining boron fluoride passed into the boron fluoride treating system where it was absorbed and returned to the reactor by compressor after being stripped from the absorbent. The liquid from the hot flash was sent to the benzene fractionating column where after removal of the remaining recycle benzene in the benzene column, the ethylbenzene and heavier products were fractionated into an ethylbenzene cut in the overhead of the ethylbenzene column and a bottom cut. The overhead was sent to storage. The fractionator bottoms were recycled back to a second reactor where the polyethylbenzenes were transalkylated to produce ethylbenzene.

During the production of ethylbenzene in the hereinabove outlined process flow scheme, it was observed that reaction products of water, boron fluoride, and the boron fluoride-modified alumina tended to form and accumulate in the process streams. The overall efficiency of the alkylation process decreased as the concentration of these reaction products became higher. Continued formation of these reaction products caused the eventual shut down of the plant.

*Example II*

This example illustrates the substantial removal of the reaction products of water, boron fluoride, and a boron fluoride-modified substantially anhydrous alumina during the production of an alkylated aromatic compound. The same processing unit described in Example I is utilized for the experiment described in this example.

The process flow scheme is modified so that a reaction zone containing iron metal is introduced into the recycle benzene stream that had previously contained reaction products. The substantially anhydrous liquid benzene is passed downflow through the zone at 500 p.s.i.g. and 70° C. Chemical analysis of the benzene before the reaction zone indicates the presence of boron and fluorides. Chemical analysis of the benzene after the reaction zone indicates substantial reaction occurring.

The overall efficiency of the alkylation process is maintained at the desired level with the reaction zone containing the iron metal in place is evidenced by the continual production of ethylbenzene until the plant is shut down at the completion of the run. The reactant is regenerated for reuse by depressuring the reaction zone and heating the boron halide-metal complex at 70° C. until the complex is substantially decomposed.

*Example III*

This example illustrates the substantial removal of the reaction products of water, boron fluoride, and a boron fluoride-modified substantially anhydrous alumina during the production of an alkylated aromatic compound. The same processing unit described in the preceding examples is utilized for the experiment described in this example.

The process flow scheme is modified so that a reaction zone containing manganese metal is introduced into the recycle benzene stream that had previously contained reaction products. The substantially anhydrous liquid benzene is passed upflow through the reaction zone at 550 p.s.i.g. and 100° C. Chemical analysis of the benzene before the reaction zone indicates the presence of boron and fluorides. Chemical analysis of the benzene after the reaction zone indicates substantial reaction occurring.

The overall efficiency of the alkylation process is maintained at the desired level with the reaction zone containing the manganese metal in place as evidenced by the continuous production of ethylbenzene until the plan is shut down at the completion of the run.

The reactant is regenerated for reuse by depressuring the reaction zone and heating the boron halide-metal complex at 50° C. until the complex is substantially decomposed.

*Example IV*

This example illustrates the substantial removal of the reaction products of water, boron fluoride, and a boron fluoride-modified substantially anhydrous alumina during the production of an alkylated aromatic compound. The same processing unit described in the preceding examples is utilized for the experiment described in this example.

The process flow scheme is modified so that a reaction zone containing iron metal is introduced into a gas stream comprising nitrogen, hydrogen, methane, and boron trifluoride. The substantially anhydrous gaseous mixture is passed upflow through the reactant at 500 p.s.i.g. and 50° C. Chemical analysis of the gaseous mixture before the reaction zone indicates the presence of reaction products. Chemical analysis of the gaseous mixture after the reaction zone indicates substantial reaction occurring. The overall efficiency of the alkylation process is maintained at the desired level with the reaction zone containing the iron metal in place as evidenced by the continuous production of ethylbenzene until the plant is shut down at the completion of the run. The reactant is regenerated for reuse by depressuring the reaction zone and heating the boron fluoride-metal complex at 50° C. until substantial decomposition of the complex occurs.

We claim as our invention:

1. A process for removing the reaction products of water, boron halide, and a boron halide-modified substantially anhydrous inorganic oxide from a substantially anhydrous fluid mixture containing the same, said reaction products including hydrates of boron halide, which comprises contacting said reaction products and fluid with a metal having an atomic number from 23 to 28 inclusive, reacting at least a portion of said reaction products with said metal at a temperature sufficient to form a stable metal halide-boron halide complex, and recovering purified fluid.

2. A process for removing the reaction products of water, boron halide, and a boron halide-modified substantially anhydrous inorganic oxide from a substantially anhydrous liquid hydrocarbon containing the same, said reaction products including hydrates of boron halide, which comprises contacting said reaction products and liquid hydrocarbon with a metal having an atomic number from 23 to 28 inclusive, reacting at least a portion of said reaction products with said metal at a temperature sufficient to form a stable metal halide-boron halide complex, and recovering purified hydrocarbon.

3. A process for removing the reaction products of water, boron fluoride, and a boron fluoride-modified substantially anhydrous inorganic oxide from a substantially anhydrous fluid mixture containing the same, said reaction products including hydrates of boron trifluoride, which comprises contacting said reaction products and fluid with a metal having an atomic number from 23 to 28 inclusive, reacting at least a portion of said reaction products with said metal at a temperature sufficient to form a stable metal fluoride-boron fluoride complex, and recovering purified fluid.

4. A process for removing the reaction products of water, boron fluoride, and a boron fluoride-modified substantially anhydrous inorganic oxide from a substantially anhydrous liquid hydrocarbon containing the same, said reaction products including hydrates of boron trifluoride which comprises contacting said reaction products and liquid hydrocarbon with a metal having an atomic number from 23 to 28 inclusive, reacting at least a portion of said reaction products with said metal at a temperature sufficient to form a stable metal fluoride-boron fluoride complex, and recovering purified liquid hydrocarbon.

5. The process of claim 1 further characterized in that said metal is iron.

6. The process of claim 1 further characterized in that said metal is manganese.

7. The process of claim 1 further characterized in that said metal is cobalt.

8. The process of claim 1 further characterized in that said metal is chromium.

9. The process of claim 4 further characterized in that said metal is manganese.

10. The process of claim 4 further characterized in that said metal is cobalt.

11. The process of claim 4 further characterized in that said metal is chromium.

12. The process of claim 4 further characterized in that said metal is iron.

13. The process of claim 12 further characterized in that said liquid hydrocarbon is a liquid aromatic hydrocarbon.

14. The process of claim 12 further characterized in that said liquid hydrocarbon is a liquid benzene hydrocarbon.

15. The process of claim 12 further characterized in that said liquid hydrocarbon is liquid benzene.

16. A process for separating hydrates of boron trifluoride from a hydrocarbon fluid containing the same which comprises contacting the fluid with a metal having an atomic number of from 23 to 28, inclusive, at a temperature sufficient to react at least a portion of said hydrates with said metal and form a stable metal fluoride-boron fluoride complex, and recovering resultant purified hydrocarbon fluid.

References Cited by the Examiner
UNITED STATES PATENTS

| | | | |
|---|---|---|---|
| 1,596,585 | 8/26 | De Groote | 208—188 X |
| 2,463,077 | 3/49 | Zimmerman et al. | 260—666 |
| 2,481,208 | 9/49 | Eberle | 260—683.66 X |
| 2,897,918 | 8/59 | Schlotthauer et al. | 55—71 X |
| 2,925,145 | 2/60 | Hayden | 55—71 X |

ALPHONSO D. SULLIVAN, *Primary Examiner.*